(12) United States Patent
Segal et al.

(10) Patent No.: US 11,169,096 B1
(45) Date of Patent: Nov. 9, 2021

(54) BODY-WORN DEVICE WITH TAMPER DETECTION, DIRT ALERTING AND DIRT COMPENSATION

(71) Applicant: Cell Detect, Inc, New Port Richey, FL (US)

(72) Inventors: David Segal, Palm Harbor, FL (US); Chris Defant, New Port Richey, FL (US)

(73) Assignee: Cell Detect, Inc., New Port Richey, FL (US)

( * ) Notice: Subject to any disclaimer, the term of this patent is extended or adjusted under 35 U.S.C. 154(b) by 53 days.

(21) Appl. No.: 16/896,631

(22) Filed: Jun. 9, 2020

(51) Int. Cl.
*G01N 21/95* (2006.01)
*G08B 21/02* (2006.01)
(Continued)

(52) U.S. Cl.
CPC .............. *G01N 21/95* (2013.01); *G01M 11/33* (2013.01); *G08B 13/186* (2013.01);
(Continued)

(58) Field of Classification Search
CPC ... A61B 5/6801; A61B 5/6802; A61B 5/6803; A61B 5/6804; A61B 5/6805; A61B 5/6806; A61B 5/6807; A61B 5/6808; A61B 5/681; A61B 5/6811; A61B 5/6812; A61B 5/6813; A61B 5/6814; A61B 5/6822; A61B 5/6823; A61B 5/6824; A61B 5/6825; A61B 5/6826; A61B 5/6828; A61B 5/6829; A61B 5/683; A61B 5/6831; Y10S 200/02; Y10S 200/36; Y10S 200/47; G01M 11/33; G01N 21/95; G01N 21/958; G01N 2021/9511; G08B 29/00; G08B 29/02; G08B 29/04; G08B 29/046; G08B 29/06; G08B 29/08; G08B 29/18; G08B 29/181; G08B 19/00; G08B 13/124; G08B 13/183; G08B 13/186; G08B 13/189; G08B 13/1895;
(Continued)

(56) References Cited

U.S. PATENT DOCUMENTS

| 4,021,217 | A | | 5/1977 | Bondybey et al. |
| 4,262,284 | A | * | 4/1981 | Stieff ................... G09F 3/0376 340/507 |
| 5,214,377 | A | | 5/1993 | Maurice et al. |
| 5,374,921 | A | * | 12/1994 | Martin .................. G08B 21/22 340/539.11 |

(Continued)

FOREIGN PATENT DOCUMENTS

| CN | 102706884 A | 10/2012 |
| JP | 2007121090 A | 5/2007 |

*Primary Examiner* — Gordon J Stock, Jr.
(74) *Attorney, Agent, or Firm* — Larson & Larson, P.A.; Frank Liebenow; Justin P. Miller

(57) ABSTRACT

A system and method for detecting degradation of a fiber optic in a strap of a body-worn device that is removably attached to an appendage or other location of a person or animal. A fiber optic is embedded within the strap. A light source emits light energy through the optical interface and into the fiber optic and a light sensor receives and detects light energy from the fiber optic. If the light energy is not received and detected from the fiber optic, the light energy is increased until the light energy is received and detected or reaches a maximum light energy at which time tampering is declared. If the light energy reaches a pre-determined threshold which is less than the maximum light energy, it is declared that the body-worn device requires servicing.

19 Claims, 17 Drawing Sheets

(51) Int. Cl.
*G01M 11/00* (2006.01)
*G08B 21/22* (2006.01)
*G08B 13/186* (2006.01)
*G08B 21/18* (2006.01)
*G08B 29/04* (2006.01)

(52) U.S. Cl.
CPC ....... *G08B 21/0286* (2013.01); *G08B 21/182* (2013.01); *G08B 21/22* (2013.01); *G08B 29/046* (2013.01); *G01N 2021/9511* (2013.01)

(58) Field of Classification Search
CPC .. G08B 21/0286; G08B 21/088; G08B 21/18; G08B 21/182; G08B 21/185; G08B 21/187; G08B 21/20; G08B 21/22; G08B 21/24; G08B 21/245
See application file for complete search history.

(56) References Cited

U.S. PATENT DOCUMENTS

| | | | |
|---|---|---|---|
| 5,471,197 A | 11/1995 | McCurdy et al. | |
| 5,523,740 A * | 6/1996 | Burgmann | G08B 21/22 340/573.4 |
| 5,525,796 A | 6/1996 | Haake | |
| 5,650,766 A | 7/1997 | Burgmann | |
| 7,189,959 B1 | 3/2007 | Morison et al. | |
| 9,024,750 B2 * | 5/2015 | Defant | G08B 13/1445 340/539.11 |
| 10,198,930 B2 * | 2/2019 | Melton | G08C 23/04 |
| 10,325,472 B1 * | 6/2019 | Harsdorff | A41B 11/00 |
| 10,360,788 B2 * | 7/2019 | Melfi | G08B 29/046 |
| 10,966,633 B2 * | 4/2021 | Defant | G01N 33/4972 |
| 10,984,645 B2 * | 4/2021 | Wojcik | G08B 6/00 |

* cited by examiner

BODY-WORN DEVICE WITH TAMPER DETECTION, DIRT ALERTING AND DIRT COMPENSATION

FIELD

This invention relates to the field of locking body-worn devices for tracking people and animals and more particularly to a body-worn device having tamper detection where the tamper detection includes compensation for dirt accumulation as well as alerting when dirt accumulates.

BACKGROUND

As prisons become overcrowded (or more overcrowded) or during certain health emergencies as experienced during the recent pandemic, it is determined that some population of prisoners are deemed safe enough to move out of the prison and spend the remainder of their jail term on house arrest. House arrest provides such trusted prisoners with the ability to leave prison, but once they reach their primary residence, the prisoner is not allowed to leave without prior approval from a prison official or parole officer.

Not many inmates can be trusted to remain at their primary residence after release without other assurances that they will remain within a pre-determined set of locations such as their home. One way to assure that the inmate remains within a pre-determined geographic area is to attach a locating device to the inmate, for example, to a limb of the inmate. The locating device periodically determines the location of the inmate, for example, using global positioning satellite technology or other radio frequency technology such as transmission/reception of a low-power radio signal from a base station. If the inmate wanders outside of an allowable geographic location as defined by GPS coordinates or the radio signal between the device and a base station is lost, it is declared that the inmate has violated house arrest and the inmate, once found, is returned to prison.

Although the locating device is secured to the inmate's body, for example with a locking strap, many have found ways to remove the locating device, then freely move without signaling that they are violating house arrest. To prevent tampering with the locking strap, many different mechanisms have been deployed to prevent removal without a valid key and to detect tampering. For example, some locating devices include a wire passing though the strap so that, if the strap is disconnected or cut, a circuit is broken and it is declared that the inmate has violated house arrest. Unfortunately, this mechanism can be bypassed with a simple jumper-wire bridging an area of the strap that will be cut.

More recently, fiber optics have been used in place of the wire for detecting tampering or removal of the strap. Being that it is substantially more difficult or impossible to insert a jumper in a fiber optic cable, it is almost impossible for the inmate or their accomplices to defeat this form of tamper detection.

It is important to know when the inmate violates house arrest, but it is almost as important not to falsely accuse the inmate of violating house arrest (e.g. tampering with their body-worn device) when the inmate has not violated house arrest and has not done any tampering. Being that the body-worn device must be removable, there must be a locking end of the strap that removably connects to a part of the body-worn device that contains the electronics for location detection, alarming and tamper detection. Being that this end of the strap is removable (e.g. using a key) from the electronic portion, there must be a fiber optic connection that allows for disconnecting that end of the strap from the electronic portion. This fiber optic connection must allow for locking and unlocking (removal) of the body-worn device for various reasons, including recharging internal batteries, maintenance, medical examinations, etc.

Typically, the body-worn device is worn 24 hours a day, even during bathing, working, and sleeping. Dirt and humidity often find their way into the interface where the strap locks to the electronics portion. When this dirt and humidity invade the fiber optic connection, either during wearing of the body-worn device or during attaching of the body-worn device, the dirt and humidity are capable of attenuating or disrupting the light signal that passes through the fiber optic connection and the fiber optic, thereby providing a false indication that the body-worn device has been tampered. Further, during normal wear and tear, constant flexing of the fiber optic tends to degrade the fiber optic, attenuating or disrupting the light signal that passes through the fiber optic.

What is needed is a system that will detect dirt in the fiber optic connection, adapt to the presence of dirt, and, in some cases notify regarding the dirt and/or humidity.

SUMMARY

A method and system for detecting tampering of a body-worn device and warning of degradation to the body-worn device is disclosed.

The system consists of a body-worn device that includes a strap (or another similar appendage) which is used to removably attach an electronics housing of the body-worn device to an appendage or other location of a person or animal. A fiber optic cable is embedded within the strap and there is an optical interface through which light can be injected into and monitored from the fiber optic cable. A light source emits light through the optical interface and into the fiber optic cable and a light sensor receives light from the fiber optic cable through another optical interface. The output of the light source is varied to compensate for degradation caused by wear of the fiber optic cable, dirt, etc. As an example, the light output of the light source is increased by increasing a pulse width or intensity at the light source. By checking the presence or absence of light of the specific pulsing at the light sensor, it can be determined if the strap is removed/tampered. Further, by comparing the light output of the light source to a pre-determined value, it can be determined whether the body-worn device need to be serviced (either cleaned or replaced).

In some embodiments, to detect and work around dirt build-up or degradation of the fiber optic, the system recognizes that the light sensor has a rise time that is proportional to the amount of light that reaches the light sensor from the light source. Narrower light pulses at the light source result in lower outputs at the light sensor and wider light pulses at the light source result in higher outputs at the light sensor. As dirt and debris build up in the optical interface or when the fiber optic inside the strap is fractured/bent but not broken, the light output of the fiber optic at the light sensor decreases. This is overcome by increasing the intensity of the light source and, therefore, increasing the output from the light sensor. In some embodiments, the body-worn device generates an alert signal before strap failure occurs or a false alarm signal is made because of weakening of the strap or dirt/debris in the optical interface.

In one embodiment, a system for detecting degradation of a fiber optic in a strap of a body-worn device is disclosed.

The body-worn device having a processor, a transceiver operatively coupled to the processor, a tamper detection circuit operatively coupled to the processor, and a source of power, the source of power providing operational power to the processor, to the transceiver and to the tamper detection circuit emits light energy into a first end of a fiber optic and waits for reception of the light energy from a distal end of the fiber optic. When the light energy is received by the tamper detection circuit from the distal end of the fiber optic, the tamper detection circuit declares that the strap of the body-worn device is intact. When the light energy is not received by the tamper detection circuit, the tamper detection circuit increases the light energy until either the light energy is at a maximum light energy or the light energy is received by the tamper detection circuit at the distal end of the fiber optic. When the light energy is at the maximum light energy, the tamper circuit declares that the strap of the body-worn device is disconnected and when the light energy is received by the tamper detection circuit at the distal end of the fiber optic, if the light energy is greater than a pre-determined threshold, the tamper circuit declares that the body-worn device requires servicing.

In another embodiment, a method of detecting degradation of a fiber optic in a strap of a body-worn device is disclosed. The method includes (a) sending an amount of light energy into a first end of a fiber optic, the fiber optic passes through the strap of the body-worn device and (b) monitoring a second end of the fiber optic, looking for the light energy. (c) After receiving and detecting the light energy, declaring that the strap of the body-worn device is intact. (d) Increasing the light energy and (e) if the light energy is greater than a maximum light energy, declaring that the strap of the body-worn device is not intact. (f) If the light energy is greater than a light energy threshold, declaring that the body-worn device requires servicing and (g) repeating steps (a) through (f).

In another embodiment, a system for detecting degradation of a fiber optic that passes through a strap of a body-worn device is disclosed. A processor is integrated into the body-worn device body-worn device. Computer instructions are stored in a non-transitory storage medium that is interfaced to the processor. The computer instructions cause the processor to control a light emitter to emit a light at the light energy into a first end of a fiber optic and the computer instructions cause the processor to monitor a second end of the fiber optic, looking for reception and detection of the light energy. When the light energy is received, the computer instructions cause the processor to declare that the strap of the body-worn device is intact. If the light energy is not received and not detected, the computer instructions cause the processor to increase the light energy until either the light energy is received and detected at the second end of the fiber optic or until the light energy is greater than a maximum light energy. If the light energy is received, the computer instructions cause the processor to declare that the strap of the body-worn device is intact. If the light energy is greater than the maximum light energy, the computer instructions cause the processor to declare that the strap of the body-worn device is not intact. If the light energy is greater than a light energy threshold, the computer instructions cause the processor to declare that the body-worn device requires service.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
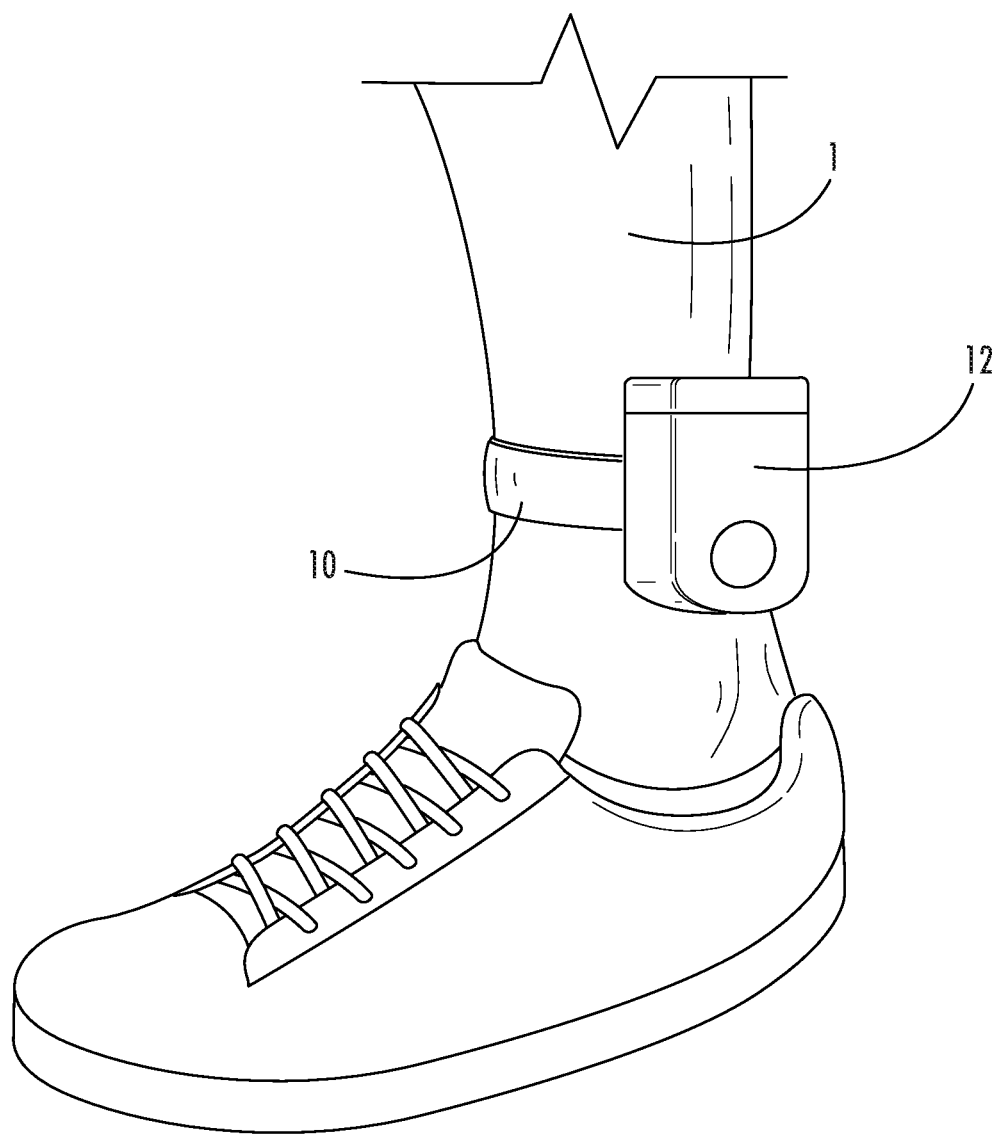
FIG. 1 illustrates a body-worn device attached to an appendage of a person.

Reference will now be made in detail to the presently preferred embodiments of the invention, examples of which are illustrated in the accompanying drawings. Throughout the following detailed description, the same reference numerals refer to the same elements in all figures.

The described system pertains to a body-worn device for monitoring the location and environment of any target person. Throughout this description, the target person is typically a convicted criminal having been placed on house arrest, but there is no restriction to any particular type of target person, nor that the target be a human being, in that the described body-worn device functions the same for any type of movable object or animal. The described system is equally applicable to any other type of scenario. For example, the target person is a teen child and the body-worn device is worn by the teen child to monitor their location.

For simplicity purposes, the following description uses, as an example, a convicted criminal as the target person. This convicted criminal is serving time, but has been released from prison or instead of prison, the convicted criminal is allowed to remain in a predetermined location for the remainder of their prison term, typically called house arrest though some such people are allowed to travel certain paths for work.

Throughout this description, a body-worn device is used as an embodiment that is understood in the field of law enforcement and corrections. There is no limitation placed upon the type of device that the disclosed system be embodied, as it is fully anticipated that the disclosed system be embodied in any type of body-worn device that is locked in place on or around any part of a body or thing.

Referring to FIG. 1, a body-worn device 8 is shown attached to an appendage 1 of a person, in this example, an ankle, though any other location on a person, animal, or inanimate object is also anticipated. As, in some embodiments, the body-worn device 8 is attached to a convicted criminal (e.g. the person is a convicted criminal) who is on house arrest, the body-worn device 8 is locked in place and cannot be easily removed (e.g. it cannot be slide over a foot or hand of the person so as to allow that person to violate house arrest without alerting authorities). The body-worn device 8 not only locks around the appendage 1 of the person, the body-worn device 8 includes various tamper/intrusion detectors that signal an alarm if any tampering occurs to the body-worn device 8, including unlocking, cutting the strap 10 of the body-worn device 8, breaking into the electronics housing 12 of the body-worn device, etc.

Figure 2:
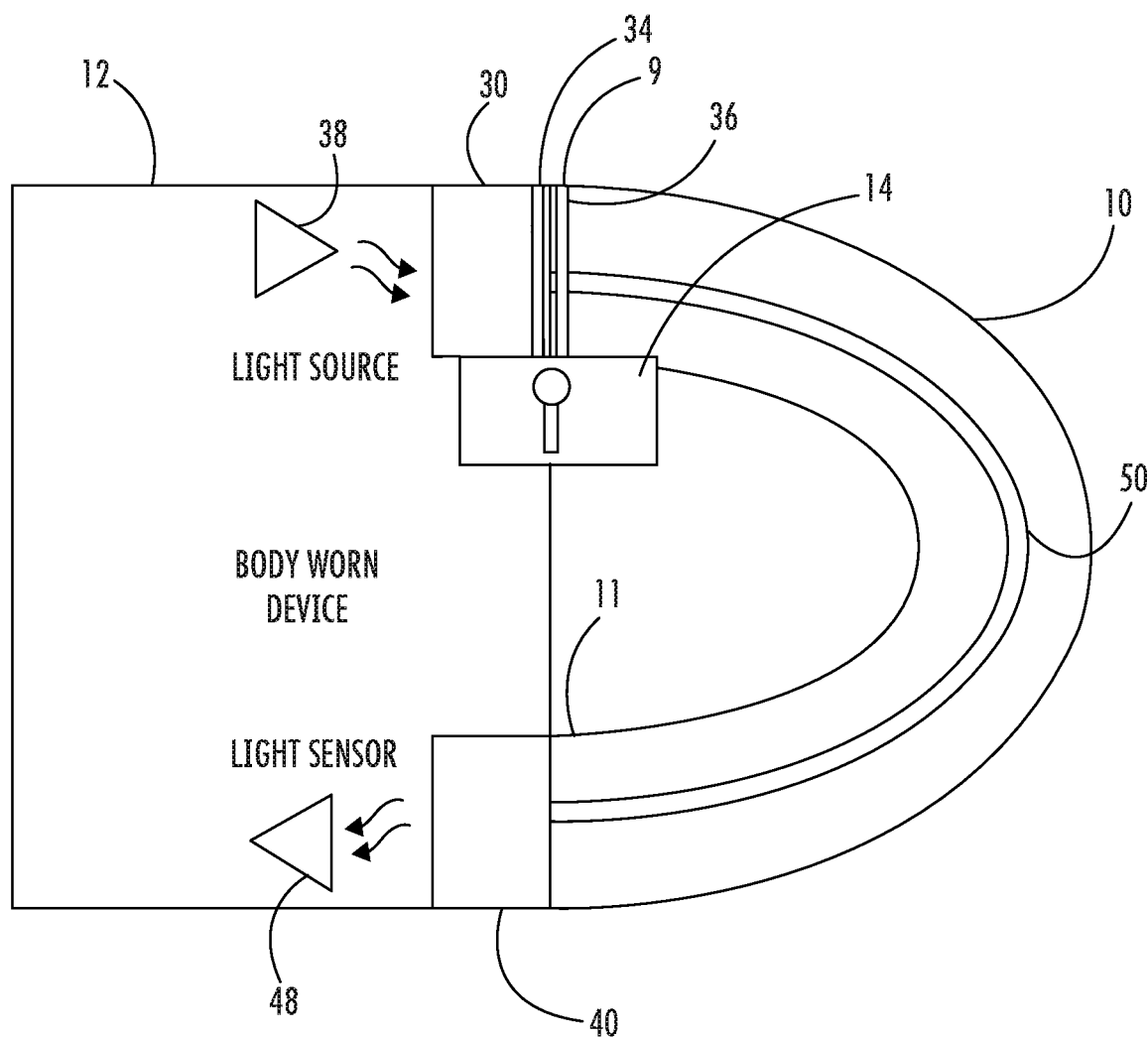
FIG. 2 illustrates a cut-away view of the body-worn device with dirt detection.

Referring to FIG. 2, a cut-away view of the body-worn device 8 with dirt detection is shown. Within the electronics housing 12 of the body-worn device 8 is circuitry that provides location services, alert/status transmission, and tamper detection as will be shown in FIG. 3. Note that it is fully anticipated that additional electronics be included within the electronics housing 12 such as cell phone detection circuits In FIG. 2, one such tamper detection circuit is shown. A light source 38 (e.g., LED) of the electronics housing 12 emits a pulse of light that optionally passes through a lens 30, then through the optical interface 34/36 to a fiber optic 50 that is embedded within the strap 10 of the body-worn device 8. At the distal end of the strap 10 of the body-worn device 8 is optionally another lens 40 and a light sensor 48 (e.g. photodiode). When the strap 10 is connected and locked to the electronics housing 12 (e.g. using a lock 14), the light pulse from the light source 38 passes through the optical interface 34/36, through the fiber optic, and onto the light sensor 48 where the pulse is detected as long as not tampering has occurred. If the strap 10 is cut or removed from the electronics housing 12, the light pulse will not be detected at the light sensor 48 and electronics within the electronics housing 12 will signal/record an alarm.

Figure 3:
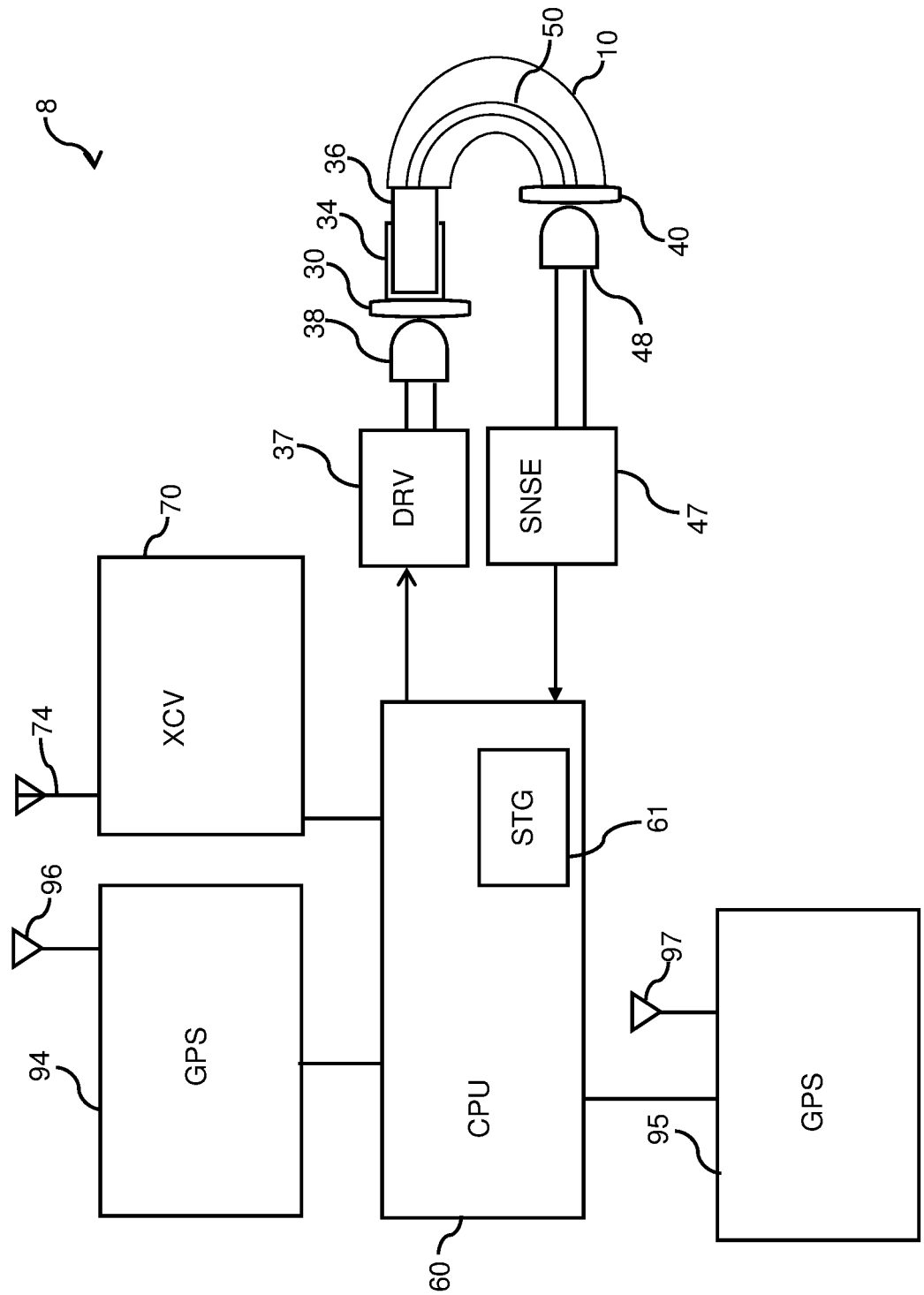
FIG. 3 illustrates a block diagram of the body-worn device with dirt detection.

Referring to FIG. 3, a block diagram of the body-worn device 8 with dirt detection (e.g. detection that servicing is required such as cleaning or replacement) is shown. This tamper circuit includes a light source 38 (e.g., LED) that is interfaced to a driver 37 is electrically connected to a processor 60 (or discrete electronics). The processor 60 controls the driver 37 to provide electric current to the light source 38 to emit pulses of light that pass through the optical interface 34/36 to a fiber optic 50 that is embedded within the strap 10 of the body-worn device 8. In some embodiments, there is a lens 30 through which the pulses of light pass to focus the pulses of light onto the optical interface 34/36.

At the distal end of the strap 10 of the body-worn device 8 is a light sensor 48 (e.g. photodiode) and, optionally another lens 40. When the strap 10 is connected and locked to the electronics housing 12, light pulses from the light source 38 passes through the optical interface 34/36, through the fiber optic, and onto the light sensor 48 where the pulse is detected by a sense circuit 47. The sense circuit 47 converts the received light pulses into electric signals that are passed to the processor 60 for analysis and tamper detection.

In some embodiments, a location detection circuit is also interfaced to the processor 60. Shown in FIG. 3 is a global positioning satellite receiver 94 with antenna 96. In this example, the global positioning satellite receiver 94 receives signals from multiple geostationary satellites and determines the location of the body-worn device 8 (e.g. latitude and longitude), relaying the location to the processor 60 where software running on the processor 60 determines if the location is within the set of locations allowed (e.g. for the convicted criminal). Typically, the Global Positioning Satellite Receiver 94 has an antenna 96 or array of antenna 96. Any known type of positioning system is anticipated for the body-worn device 8 including any type of signal strength location determination, triangulation, etc. For example, in some embodiments, determination that the location is outside of the set of allowed locations is made by software running on the processor 60 after the wireless transceiver 70 loses contact with a base station 7 for a period of time.

If the location is outside of the set of allowed locations, the software running on the processor 60 either logs the event (e.g. in persistent storage 61 for later access by law enforcement personnel) or the software running on the processor 60 signals a remote location (e.g. a server 500 —see FIG. 4) by transmitting a wireless signal from a wireless transceiver 70 (or transmitter) by way of an antenna 74. For example, if software running on the processor 60 initiates a pulse by the driver 37 and there is no corresponding reception of a pulse of light by the light sensor 48 and sense circuit 47, it is assumed that tampering has occurred to the body-worn device 8 and a packet of data indicating notification of such tampering is transmitted from the wireless transceiver 70, either directly or indirectly to the server 500 and the server 500 notifies law enforcement personnel (e.g. a parole officer) of the tampering. There are many additional ways for detecting tampering or removal of a body-worn device 8 known in the industry, all of which are anticipated and included here within. For example, in some embodiments, a light sensor within the electronics housing 12 detects if the electronics housing 12 is pried open as normally there is no light within the electronics housing 12. There are many types of tamper detection devices anticipated including the above and/or any other type of tamper detection including, but not limited to, motion sensors and accelerometers (e.g. if no movement is detected for a long period of time it is assumed that the body-worn device 8 has been removed from the body).

The wireless transceiver 70 is interfaced to the processor 60 and the processor 60 communicates with and controls the operation of the wireless transceiver 70 by sending commands and data to the wireless transceiver 70 and receiving status and data back in a similar manner. Because such transceivers often consume significant power, in some embodiments, the processor 60 controls the wireless transceiver 70 to power down the wireless transceiver 70 (or any other subsystem) when not in use.

Figure 4:
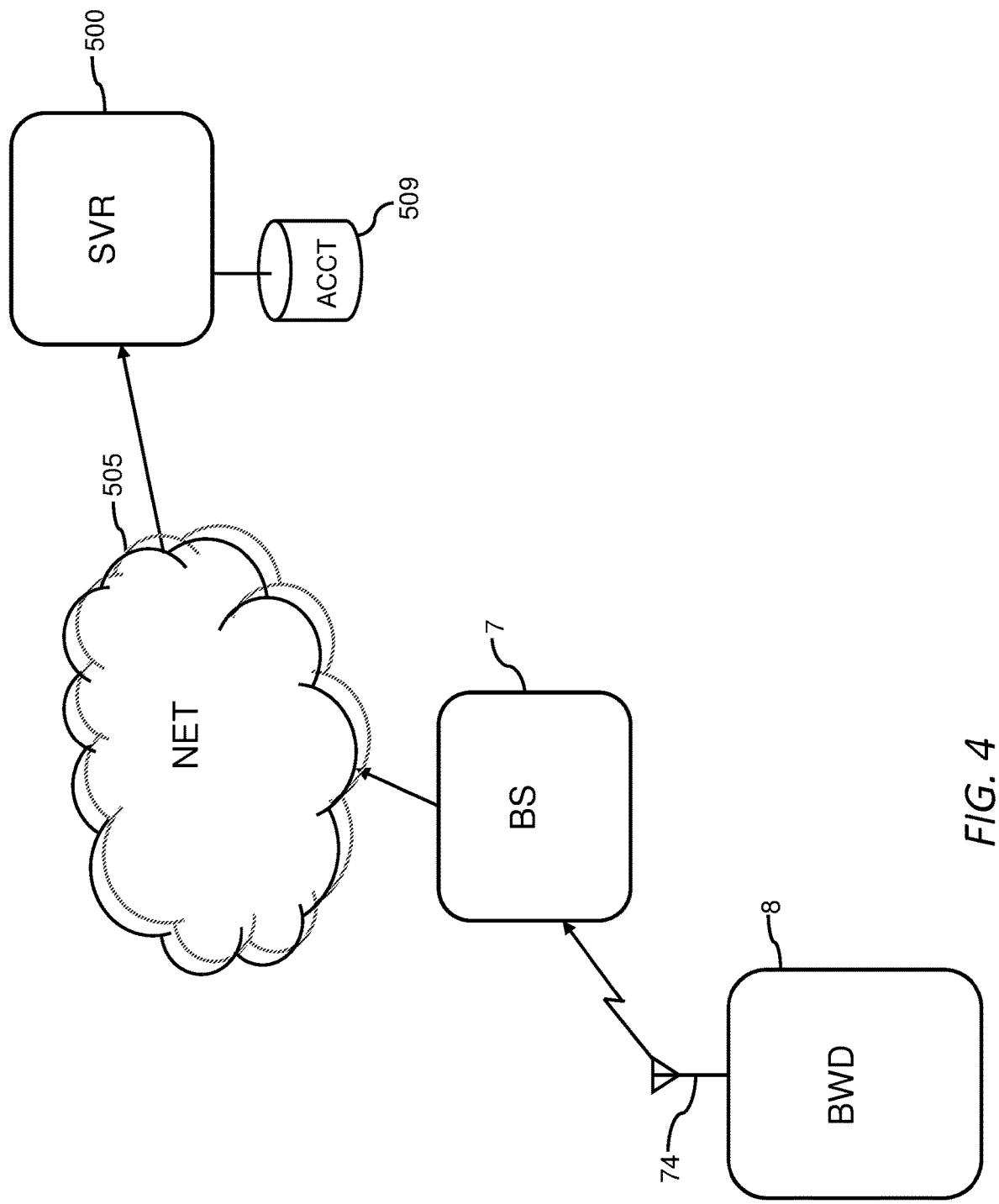
FIG. 4 illustrates a data connection diagram of a system using one or more the body-worn devices with dirt detection.

In some embodiments, the body-worn device 8 communicates wirelessly to an external system such as the server 500 to signal alarms, provide status, receive configuration data, etc. In such embodiments, the wireless transceiver 70 and antenna 74 communicates with a wireless network or with a base station 7 (see FIG. 4) by any known wireless communications mechanism. It is anticipated that the wireless transceiver 70 operate over any known frequency with any known network, including the cellular network, for example, all known and future wireless networks or point-to-point systems. Such wireless networks include, but are not limited to, the cellular phone network (e.g., GSM, 4G, 5G, CDMA, AMPS), wireless Internet (e.g. WiFi-802.11x), etc. Point-to-point systems include Bluetooth, citizen band radios, walkie-talkie radios, and any other licensed or unlicensed forms of wireless communications. These communication systems enable the body-worn device 8 to communicate wirelessly with other devices (e.g. a base station 7 as shown in FIG. 4) through a network such as a Wi-Fi network or a cellular network as shown FIG. 4. Through whatever communications mechanism used, data is exchanged between each body-worn device 8 and a server 500 (see FIG. 4) providing alerting, status, configuration, reconfiguration, etc. It is fully anticipated that the wireless transceiver 70 be any type of transceiver, operating over any known frequency or group of frequencies, any known power level(s), and either half-duplex or full-duplex. When the wireless transceiver 70 is half-duplex, the processor 60 controls whether the wireless transceiver 70 is receiving or it is transmitting by a mode control.

In some embodiments, a cellphone detection circuit 95 is included and interfaced to the processor 60. Shown in FIG. 3, the cellphone detection circuit 95 has an antenna 97 for receiving cell phone signals from nearby cell phones (not shown). In this example, when the cellphone detection circuit 95 receives signals from a nearby cellphone cell phone, the cellphone detection circuit 95 signals the processor and software running on the processor 60 controls the wireless transceiver 70 to signal the presence of such cell phone signal to warn authorities of a cell phone being used in a restricted area.

The body-worn device 8 includes a source of power (not shown for brevity reasons). It is well known how to power such devices from any of various power sources, including, but not limited to, batteries, rechargeable batteries, solar cells, radio frequency parasitic extraction, capacitors, super capacitors, fuel cells, etc., including combinations of such.

Data is transferred between the processor 60 and the wireless transceiver 70 in any way known in the industry including, but not limited to, shared memory (not shown), serial transfer, parallel transfer, any combination, etc. In some embodiments, though not required, data from the processor 60 is encrypted before transmission. In such, the data is either encrypted by instructions running on the processor 60, or, in some embodiments, by an encryption module within or external to the wireless transceiver 70. In some embodiments in which there is a base station 7, data to/from the base station 7 is encrypted.

In some embodiments, a piezoelectric or other sound emitting device is included (not shown for clarity and brevity reasons). In some such embodiments, the sound emitting device emits a sound as an audible alert when the location of the body-worn device 8 is outside of the set of allowed locations or when dirt/dust builds up in the optical interface 34/36. The audible alert from the sound emitting device is used to augment the wireless delivery of the alert information or as an alternative. In some embodiments, if a wireless communication fails, the audible alert is initiated.

In some embodiments, the processor 60 includes a time-of-day function. In such embodiments, the processor 60 has the ability to record the time and/or date of any event and to transmit the time and/or date to the base station 7 along with any alert and/or heartbeat transmission, making it difficult to periodically replay any prior transmission in order to thwart sensing that the location of the body-worn device 8 is outside of the set of allowed locations.

Referring to FIG. 4, a block diagram of a system that includes the body-worn device 8 is shown. In this, the body-worn device 8 communicates with a base station 7 that is typically placed within the home in which house arrest is required. The base station 7 receives communications from the body-worn device 8 such as heartbeat/health transmissions, status transmissions, and any event such as tampering events or indications that the location of the body-worn device 8 is outside of the set of allowed locations. The base station 7 relays some or all of these communications to the server 500 through a network 505. In some embodiments, the base station 7 communicates with the server 500 through any combination of wired or wireless networks, all encompassed in the shown network 505. Also shown, the server 500 has access to account information 509. The account information 509 includes names, addresses, phone numbers to which the body-worn devices 8 are assigned, current locations and status for each body-worn device 8, etc.

In some embodiments, the body-worn device 8 communicates directly with the server 500 without the need for a base station 7. For example, the wireless transceiver 70 of the body-worn device 8 is a cellular transceiver (with integral SIM card) and the body-worn device 8 communicates through the cellular network (e.g. Network 505 includes the cellular network), for example, by sending and receiving Short Message Service (SMS) packets to/from the server 500.

Although any form of attachment mechanism is anticipated for the body-worn device 8, in some embodiments, the attachment mechanisms and electronics housing 12 are designed to prevent removal under normal wear and impact that often occurs during the wearing of such device such as, during exercise, walking, running, etc. Furthermore, in some embodiments, the attachment mechanisms and electronics housing 12 are designed to resist penetration by substances that normally contact the wearer such as water during showering, rain, etc. Although any suitable material is anticipated, it is preferred that at least the surface of the strap 10 and/or electronics housing 12 be made from a hypoallergenic material such as Santoprene, being that the body-worn device 8 will be worn for long periods of time. It is also preferred that the strap 10 be made from materials that will not significantly stretch, even when heated. Stretching is not desired because, in some cases, stretching enables easy removal without detection of tampering. In some embodiments, the electronics housing 12 is made of an impact resistant polycarbonate that is rugged, tamper resistant, and seals the electronics from the surrounding environment.

Figure 5:
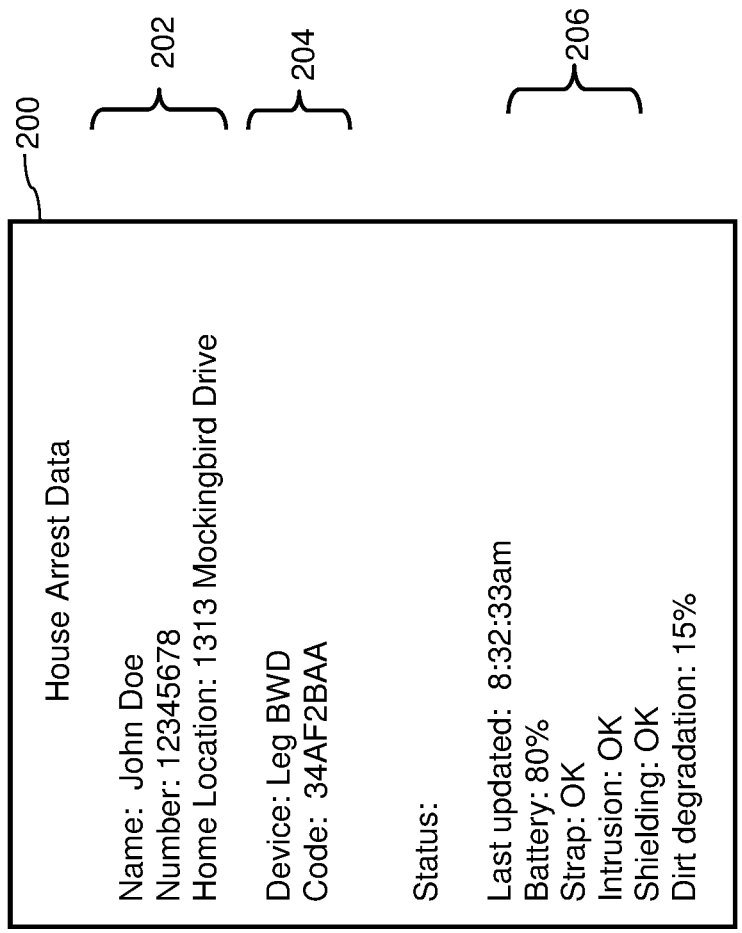
FIGS. 5-7 illustrate exemplary user interfaces showing status of the body-worn device with dirt detection.

Referring to FIG. 5, an exemplary user interface 200 showing the status of a body-worn device 8 is shown. In this exemplary user interface 200, data pertaining to the person 202 includes a name (John Doe), an inmate number (12345678), and a home location (1313 Mockingbird Drive). Data 204 pertaining to the body-worn device 8 assigned to this inmate includes a description of the device (body-worn device 8 for a leg) and a code or serial number (34AF2BAA) which is, for example, a serial number of this body-worn device 8. Next, status 206 of the assigned body-worn device 8 is shown/displayed, a condition of the battery, whether there has been any tampering of the body-worn device 8, the latitude and longitude of the body-worn device 8, and a degradation factor for the optical interface 34/36 of the body-worn device 8 (e.g. 15%). Note that, in some embodiments, more or less information is included.

Figure 6:
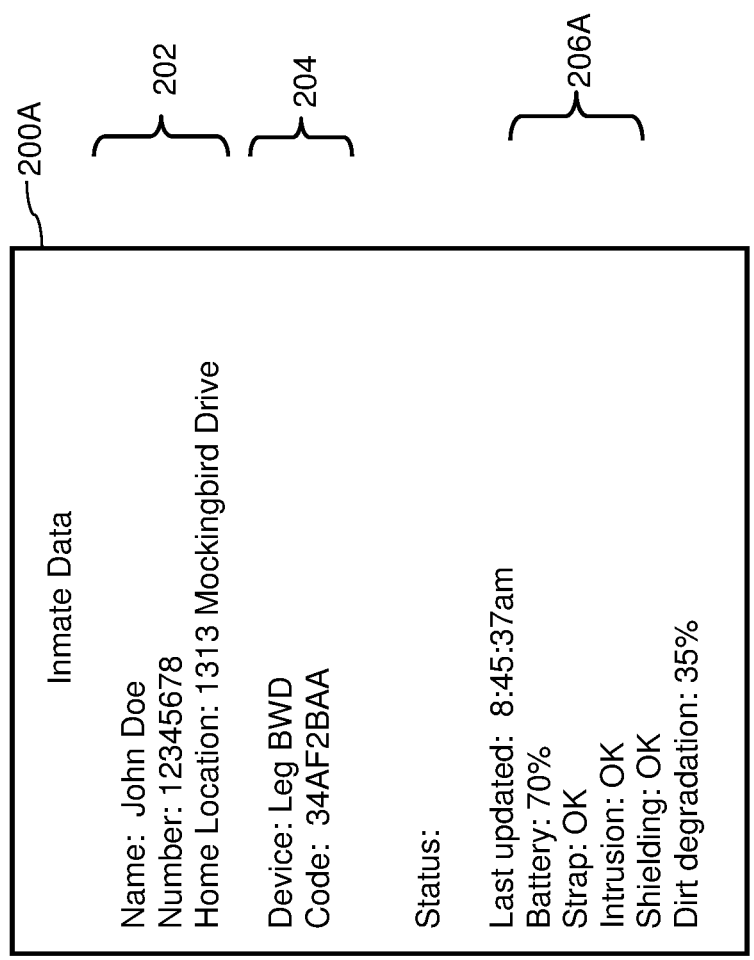

Referring to FIG. 6, an exemplary user interface 200A shows status of a body-worn device 8. In this example, the status 206A shows that the optical interface 34/36 of the body-worn device 8 has degraded (e.g. 35%).

Figure 7:
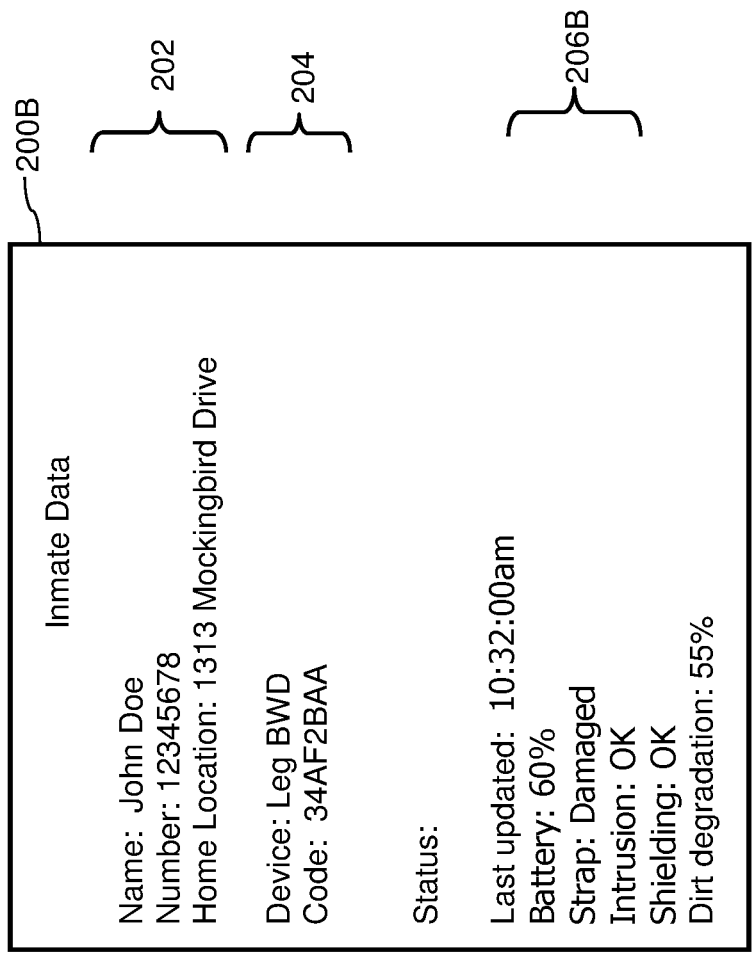

Referring to FIG. 7, an exemplary user interface 200B shows status of a body-worn device 8. In this example, the status 206B shows that the optical interface 34/36 of the body-worn device 8 has further degraded (e.g. 55%) and it is declared that the strap has degraded and the body-worn device 8 needs to be cleaned or replaced. In this case, in some embodiments, a parole officer be dispatched to the location of the house arrest to make sure the convicted criminal is at the expected location and to replace the body-worn device 8 or clean the optical interface 34/36 of the body-worn device 8. In some embodiments, the convicted criminal is in prison and prison staff replace/clean the body-worn device 8.

The user interface shown is an overly simplified interface for understanding purposes.

Figure 8:
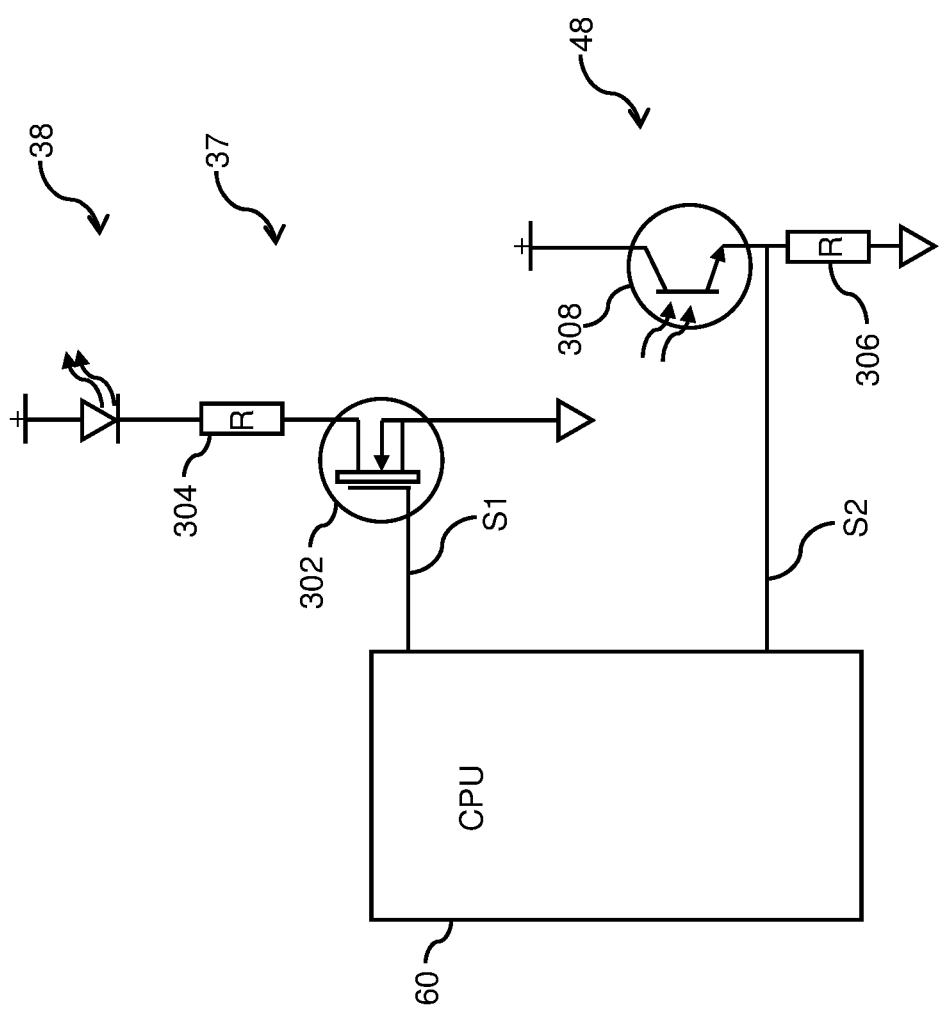
FIGS. 8 and 8A illustrate partial schematics of the body-worn device with dirt detection.
Figure 8A:
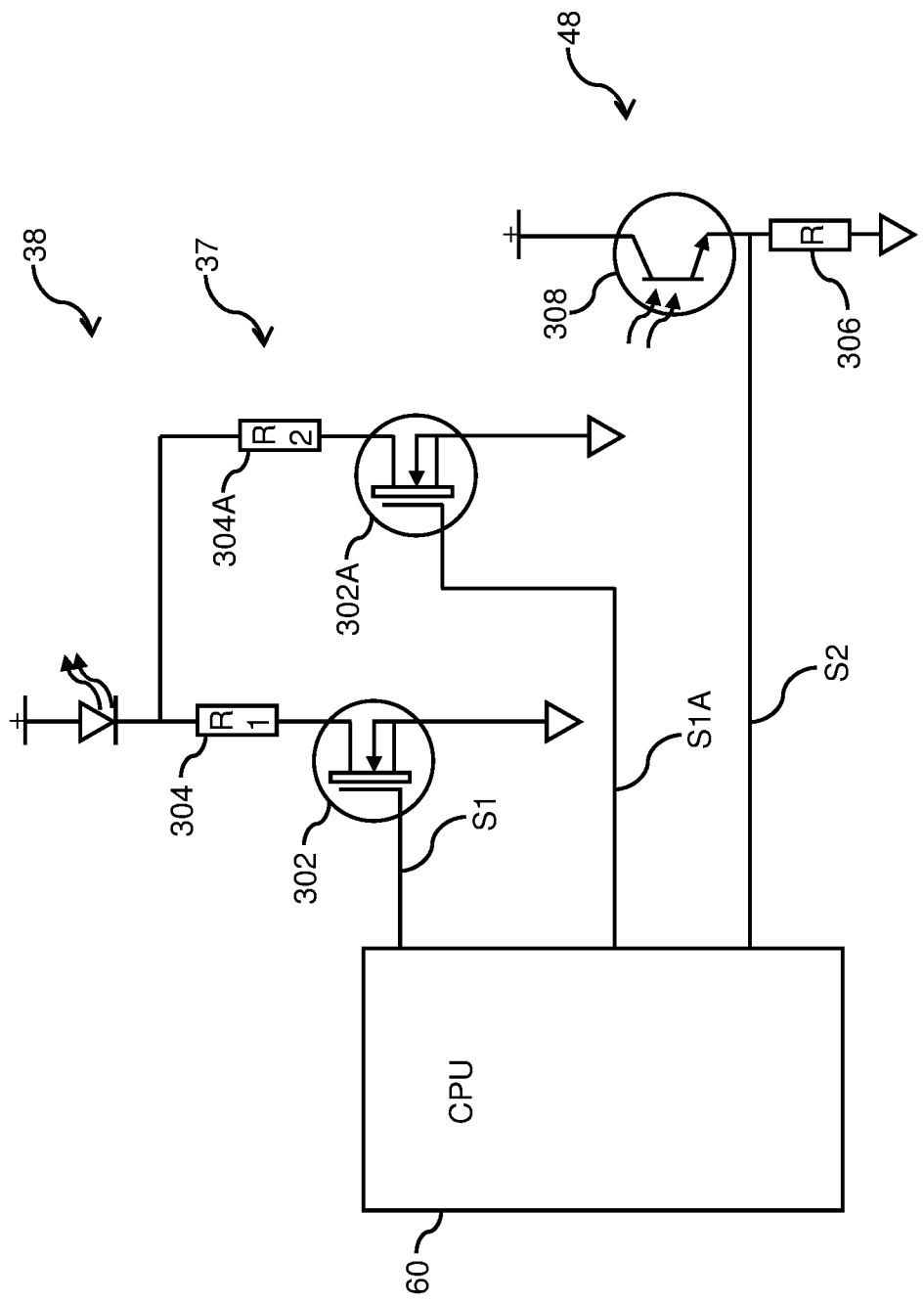

Referring to FIGS. 8, 8A, 9-11 and 11A, an exemplary circuit diagram of the driver 37, light transmitter 38 and light sensor 48 is shown (FIGS. 8 and 8A) along with electrical signals shown in in FIGS. 9-11 and 11A representing the transmit signals S1/S1A and the receive signal S2 of FIGS. 8 and 8A. Note that polarities, amplitudes and slopes of such signals are not necessarily correct as these figures are for illustration only.

Figure 9:
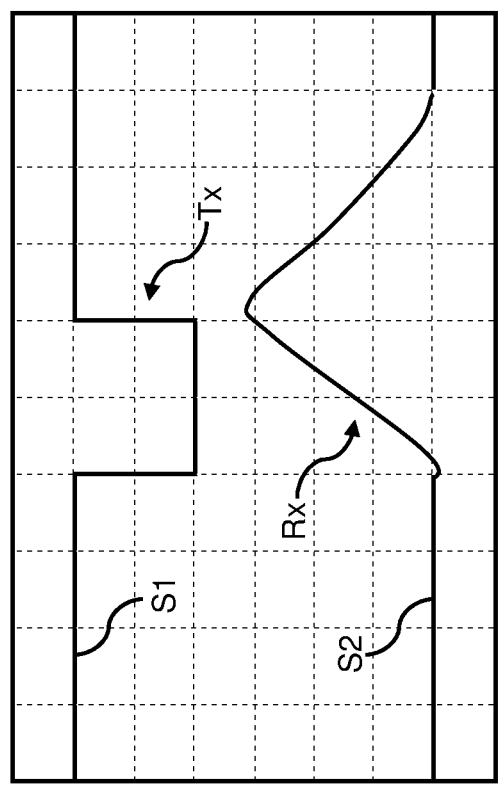
FIGS. 9-11 and 11A illustrate exemplary waveforms from the partial circuit of the body-worn device with dirt detection.

In FIG. 9, the transmit signal S1 is shown going negative for two periods of time indicated by Tx. This causes the transistor 302 to conduct for that amount of time, thereby allowing current flow through the current limiting resistor 304 and light source 38 (e.g. light emitting diode) for two periods of time, resulting in an emission of light from the light source 38 (and into the fiber optic 50) at a specific light output. Note that the current limiting resistor 304 determines how much power is applied to the light source 38.

In this example, the received light from the fiber optic 50 is directed at the light sensor 48, which in this example is a phototransistor 308 connected to another current limiting resistor 306, which produces the received signal, S2. As the delay for light traveling through a short length of fiber optic 50 is almost zero, the receive signal S2 starts to register reception of the light almost immediately after the emission of light begins. Note that light sensors 48 (e.g. phototransistors 308, photodiodes) generally have a rise time that is proportional to the amount of light that reaches the semiconductor light sensor. In this, when the light is attenuated, for example, by minor damage to the fiber optic 50 or by dirt or debris collecting in the optical interface 34/36, the amount of light reaching the light sensor 48 (e.g. phototransistors 308) decreases.

Figure 10:
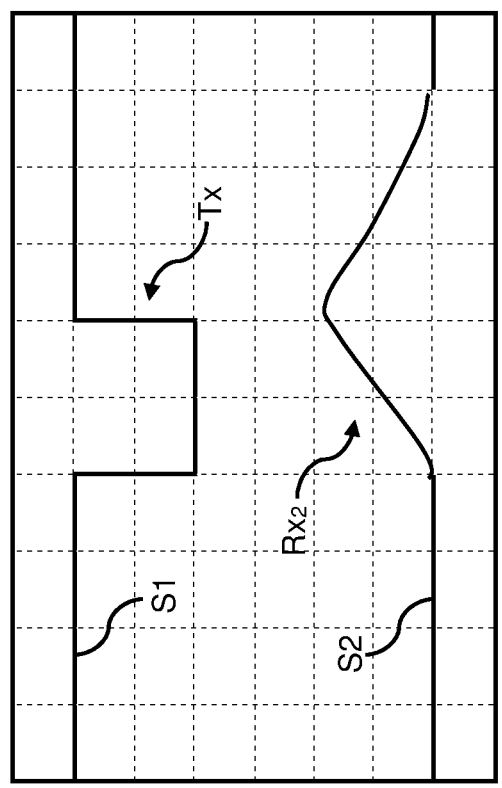
Figure 11:
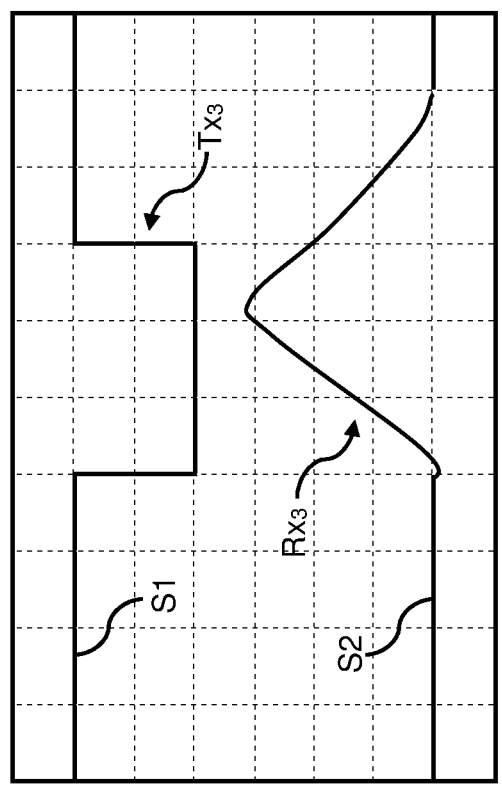

In FIG. 9, the Rx signal is shown rising to an amplitude of around three divisions, as in this example, the fiber optic 50 is new and the optical interface 34/36 is clear of any debris. In FIG. 10, the Rx2 signal is shown rising to an amplitude of around two divisions (one division less than Rx), as in this example, either the fiber optic 50 has minor damage or debris has intruded into the optical interface 34/36, or both. As shown in FIG. 11, software running on the processor 60 recognizes the decrease in amplitude of the Rx2 signal and the software running on the processor 60 increases the pulse width of the transmit signal S1 shown as the $Tx_3$ signal, for example to three periods of time and, thereby, increases the light output of the light source 38. As this longer on-time results in more light reaching the light sensor 48 (e.g. phototransistors 308), therefore the received signal $Rx_3$ reaches a peak value of three divisions, similar to the Rx waveform. In this way, the software running on the processor 60 compensates for the minor damage to the fiber optic 50 and/or debris that has intruded into the optical interface 34/36 by increasing the pulse width of the transmit signal S1.

Figure 11A:
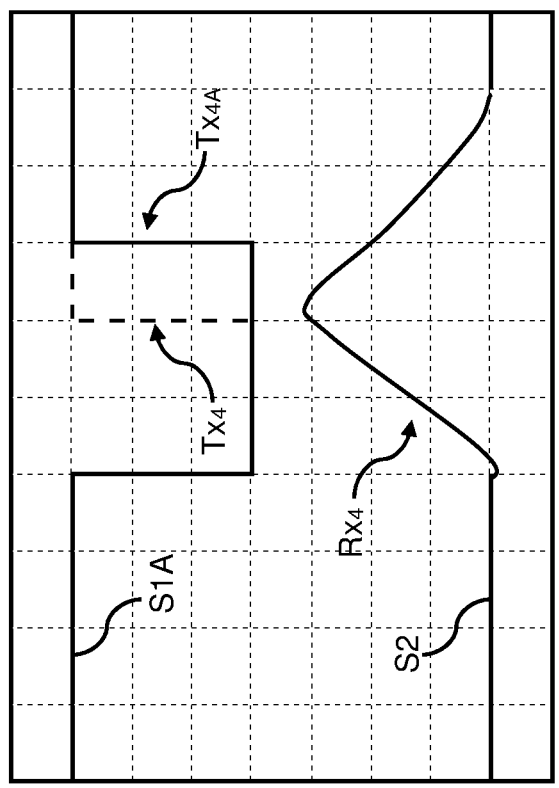

In another embodiment as shown in FIGS. 8A and 11A, software running on the processor 60 recognizes the decrease in amplitude of the Rx2 signal and the software running on the processor 60 increases the light output of the light source 38 by increasing the electrical current provided to the light source 38 (e.g. light emitting diode) via S1A of FIG. 8A, and thereby the amplitude or brightness of the light signal. The transmit signal S1A from the processor 60 saturates a second transistor 302A that is couple to a second current limiting resistor 304A that has a lower resistance than the current limiting resistor 304, thereby providing greater current to the light source 38 (e.g. light emitting diode) and producing a higher amount of light energy. In some embodiments, the pulse width of the transmit signal S1A is maintained, shown as the $Tx_4$ signal, for example two periods of time, as the greater current (e.g. three divisions of magnitude) to the light source 38 (e.g. light emitting diode) results in more light reaching the light sensor 48 (e.g. phototransistors 308). In some embodiments, the pulse width of the transmit signal S1A is also increased, shown as the $Tx_{4A}$ signal, for example three periods of time, as this longer on-time results in more light reaching the light sensor 48 (e.g. phototransistors 308), therefore the received signal Rx4 reaches a peak value of three divisions, similar to the Rx waveform. In some embodiments, both the pulse width and the amount of current are controlled in steps to overcome degradation of the fiber optic 50 and/or dirt in the optical interface 34/36.

Therefore, the software running on the processor 60 compensates for degradation due to, for example, minor damage to the fiber optic 50 and/or debris that has intruded into the optical interface 34/36 by either increasing the pulse width of the transmit signal S1 or increasing the current provided to the light source 38, or both.

As the software running on the processor 60 compensates for minor damage to the fiber optic 50 and/or debris that has intruded into the optical interface 34/36 by increasing the light output of the light source 38, the software running on the processor 60 monitors values associated with the light output (e.g. pulse width and current through the light source 38) and if these values exceed a pre-determined threshold or light energy threshold, the software running on the processor 60 declares that the body-worn device 8 has degraded and needs to be cleaned and/or replaced. In some embodiments, after the software running on the processor 60 declares that the body-worn device 8 has degraded, the software running on the processor 60 signals (e.g. through an indicator light or a wireless transmission) that the body-worn device 8 has degraded.

Figure 12:
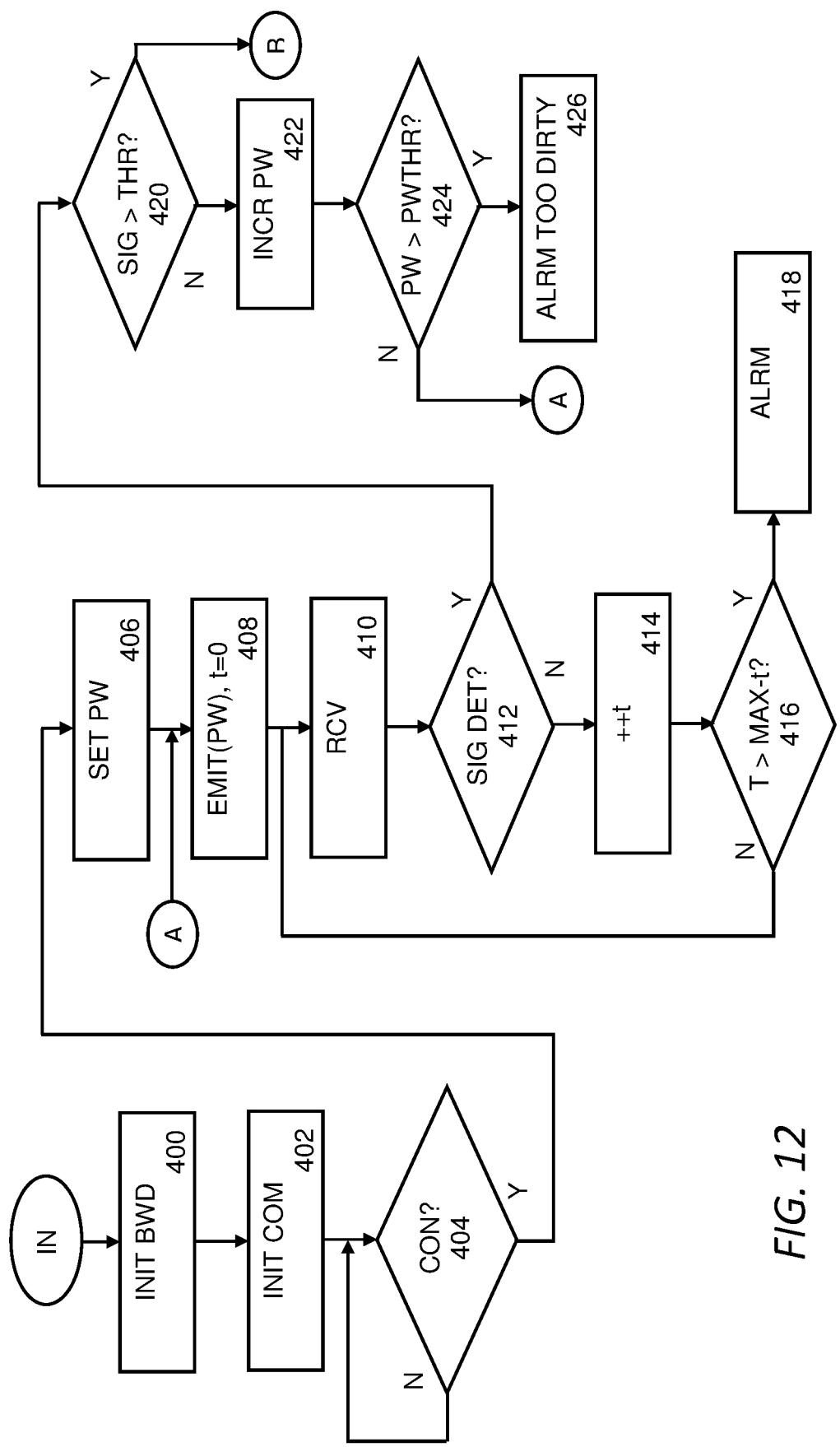
FIG. 12 illustrates a flow chart of the controller of the body-worn device with dirt detection.
Figure 13:
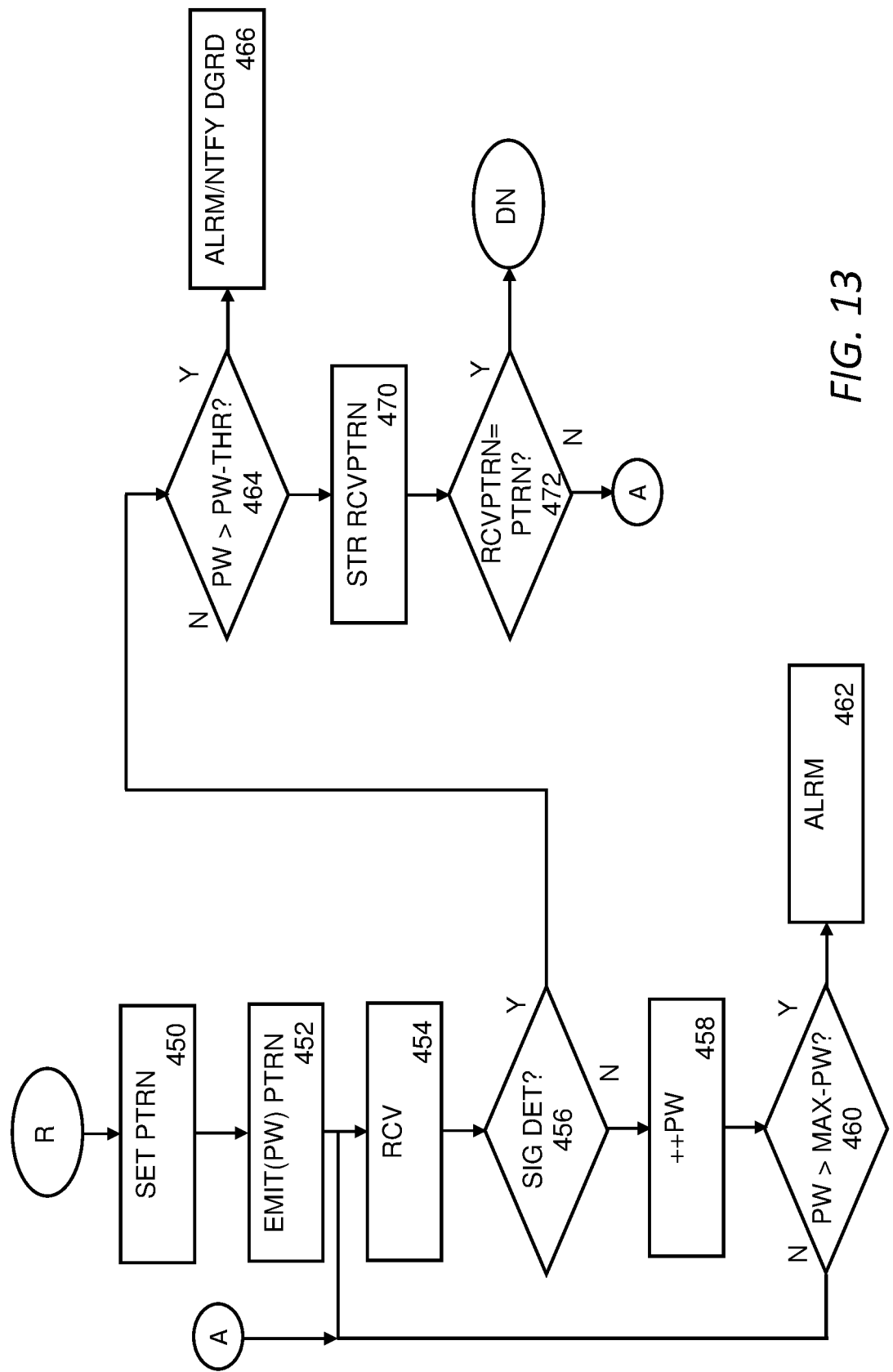
FIG. 13 illustrates a second flow chart of the controller of the body-worn device with dirt detection.

Referring to FIGS. 12 and 13, typical flow charts of the body-worn device 8 are shown. In FIG. 12, it is assumed that the body-worn device 8 has been installed (e.g. on a person). The body-worn device 8 initializes 400 (e.g. resets values to defaults), then initializes communications 402, either with a base station 7 or with a server 500 through any topologies of networks 505. The body-worn device 8 then waits until verifying 404 that communications with either with the base station 7 or with the server 500 functions.

Next, the body-worn device 8 sets 406 the power output to a starting value (e.g. two time divisions in the example above) and emits 408 a pulse of light at time zero. In a loop, the light sensor 48 is checked 410 for received light and if the received light signal is not detected 412, the time is incremented 414 and if the time is greater than a max time 416, an alarm 418 is generated, as no light is being received and, therefore, it is assumed that the strap 10 is not connected properly to the electronics housing 12.

If, instead, the received light signal is detected 412, then the received signal is compared 420 to a receive signal threshold (e.g. in the example above, is the received signal greater in amplitude than two divisions). If the comparison 420 determines that the received signal is greater than the receive signal threshold, then the encoded transmission of FIG. 13 (or similar) is performed.

If the comparison 420 determines that the received signal is not greater than the receive signal threshold, then the power output is incremented 422. If the power output is now greater 424 than a predetermined threshold, then an alarm 426 is signaled indicating that either the fiber optic 50 or the optical interface 34/36 have degraded, possible due to excessive dirt, humidity, or degradation of the fiber optic 50. If 424 the pulse width is less than a maximum power output (e.g. maximum light energy), then the prior loop 408/410/412/414/416 repeats using the new, incremented power output. This process sets the power output based upon the quality of the fiber optic 50 and the optical interface 34/36.

Once the power output is set to a base value as determined by the above process, normal periodic checking to make sure that the strap 10 has not been cut or tampered is performed, for example, as shown in FIG. 13.

In FIG. 13, an encoded transmission (or similar) is transmitted through the fiber optic 50. This encoding prevents someone from injecting a light signal into the fiber optic 50 in order to cut the strap 10 without initiating an alarm. For example, if three pulses of light are emitted at 20 ns intervals, then in order to defeat this protection, someone would have to inject sufficient light having three pulses that are emitted at 20 ns intervals. This makes it more difficult for someone to bypass the optical tamper protection and release the convicted criminal from the body-worn device 8. Therefore, in FIG. 13, in some embodiments, the body-worn device 8 sets a pattern 450 (e.g. a pseudo random or random pattern) then emits that pattern 452 (e.g. emitting light pulses of the current pulse width from the light source). Note, for simplicity and understanding, it is assumed that the emitting 452 and receiving 454 operate in parallel (concurrently), for example using an interrupt driven system. In a loop, the receive signal S2 is received 454 and detected 456. If the signal is not detected 456, the power output is incremented and the loop continues until a maximum power output is reached 460, at which time an alarm 462 is issued as one or more light pulses have not been received. As each signal is received 456, the power output is compared to a pre-determined threshold 464 and if the power output is greater than the predetermined threshold, an alarm/notification 466 is emitted indicating that the body-worn device 8 needs servicing/replacement as the optical interface 34/36 and/or fiber optic 50 have degraded. The signal is then stored in a received pattern 470, then the received pattern is compared 472 to the sent pattern and once the two compare equally, this check is complete. If the received pattern as compared 472 to the sent pattern do not yet match (e.g. reception is not complete yet), the reception loop 454/456/458/460 repeats until either the correct received pattern is received (indicating lack of tampering with the body-worn device 8) or the maximum output power has been reached (indicating tampering).

It is anticipated that the periodic checking to make sure that the strap 10 has not been cut or tampered is performed, for example, as shown in FIG. 13, is repeated periodically to make sure there is no tampering with the strap 10. Also, in some embodiments, before the alarm 462 is issued, the body-worn device 8 is reinitialized as in FIG. 12.

Figure 14:
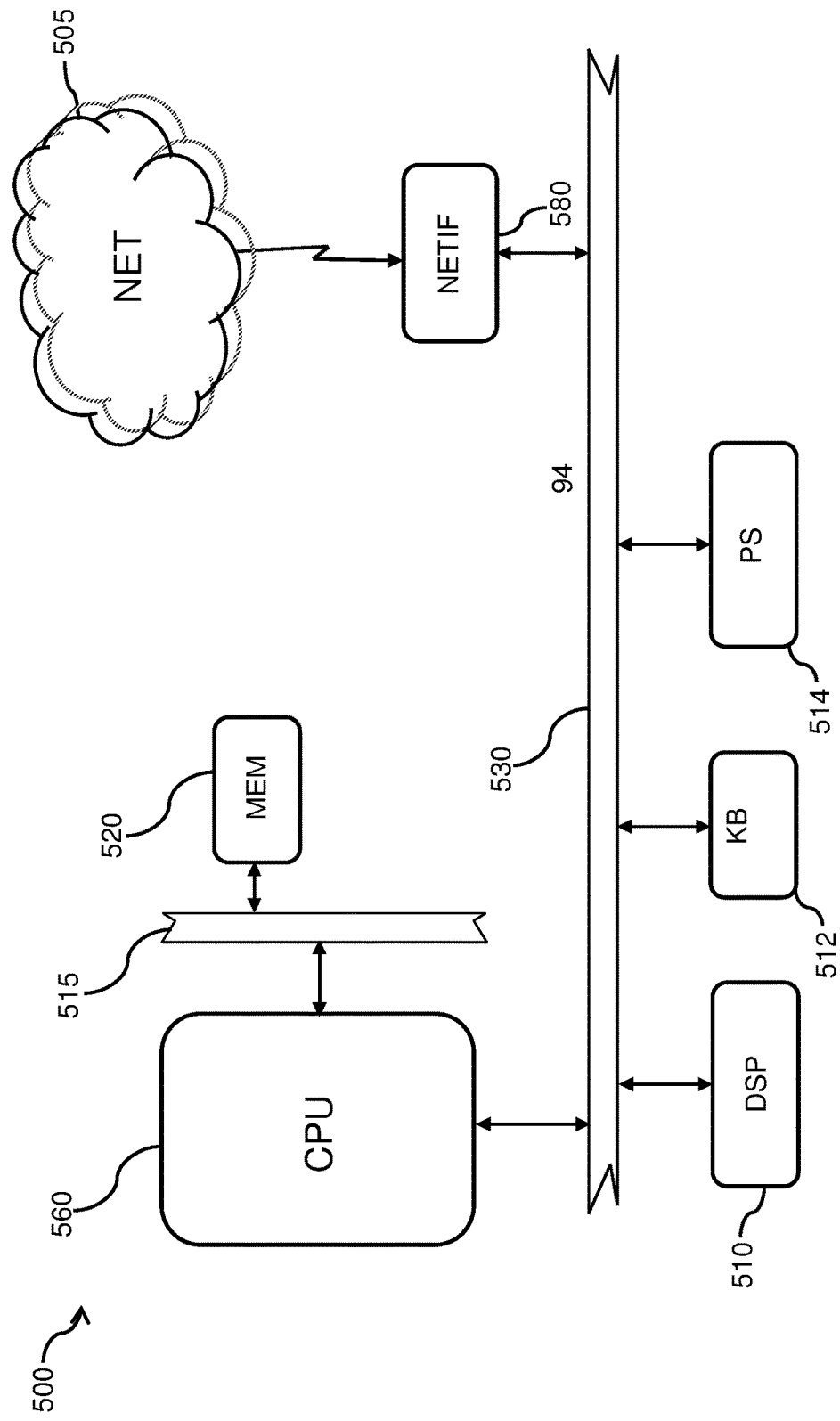
FIG. 14 illustrates a schematic view of a typical computer-based body-worn device system.

Referring to FIG. 14, a schematic view of an exemplary server 500 is shown. This exemplary system represents an exemplary processor-based server as used in the disclosed system. Although, throughout this description, a processor-based system is described, it is known to implement the same or similar functionality in a system of logic or analog components providing similar functionality in an equivalent system.

The exemplary server 500 is shown in its simplest form, having a single processor 560 (e.g., microprocessor, etc.). Many different computer architectures are known that accomplish similar results in a similar fashion and the present invention is not limited in any way to any particular processing element. In exemplary circuitry of the server 500, a processor 560 executes or runs stored programs that are generally stored for execution within a memory 520. The processor 560 is any processor. The memory 520 is connected to the processor by a memory bus 515 and is any memory 520 suitable for connection with the selected processor 560, such as SRAM, DRAM, SDRAM, RDRAM, DDR, DDR-2, etc. Also connected to the processor 560 is a system bus 530 for connecting to peripheral subsystems. In general, persistent storage 514 is interfaced to the processor 560 through the system bus 530 and is used to store programs, executable code and data persistently. Examples of persistent storage include disk drives, flash memory, etc. As known in the industry, various input/output devices are connected to the processor 560 through the system bus 530 such as a display 510 and keyboard 512.

In order to communicate with one or more body-worn devices 8, either directly or indirectly through one or more base stations 7, the server 500 has a network interface 580 that communicates with the processor 560, for example, through the system bus 530. For example, the network interface 580 communicates with the body-worn devices 8 through a network 505 which is any combination of wired and/or wireless networks utilizing any combination of network protocols including, but not limited to, Ethernet, Wi-Fi, LTE, 4G, 5G, and CDMA.

Figure 15:
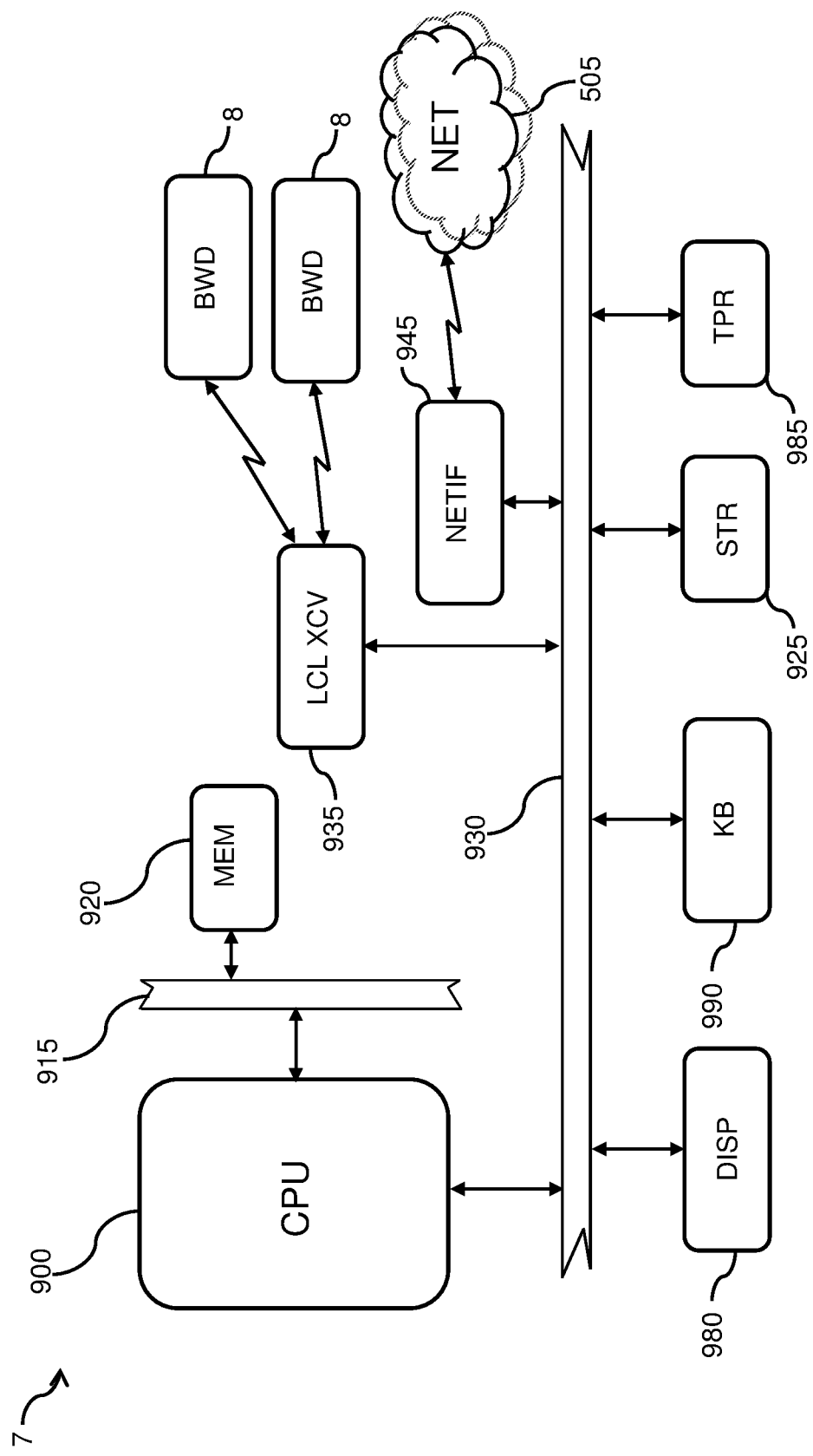
FIG. 15 illustrates a schematic view of an exemplary system of a base station.

Referring to FIG. 15, a schematic view of an exemplary system of the base station 7 is shown. The example system represents an exemplary processor-based system. Although, throughout this description, a processor-based system is described, it is known to implement the same or similar functionality in a system of logic or analog components providing similar functionality in an equivalent system.

The base station 7 as shown in its simplest form has a single processor for the base station controller 900 (e.g., controller, microcontroller, microprocessor, etc.). Many different computer architectures are known that accomplish similar results in a similar fashion and the present invention is not limited in any way to any particular processing element 900. In exemplary systems, a processor (the base station controller 900) executes or runs stored programs that are generally stored for execution within a memory 920. The base station controller 900 is any suitable processor. The memory 920 is connected to the processor by a memory bus 915 and is any memory 920 suitable for connection with the selected base station controller 900, such as SRAM, DRAM, SDRAM, RDRAM, DDR, DDR-2, etc. Also connected to the controller 900 is a system bus 930 for connecting to peripheral subsystems. A secondary storage 925 is interfaced to the base station controller 900 through the system bus 930 and is used to store programs, executable code and data persistently. Examples of secondary storage 925 include semiconductor disks, rotating media, hard disks, CD-ROM, DVD-RW, CD-RW, flash memory, etc.

The base station 7 communicates with one or more body-worn devices 8 through a base station wireless transceiver 935. The base station wireless transceiver 935 is preferably interfaced to the controller 900, for example, through the system bus 930 but alternately interfaces through an input port, etc. The base station controller 900 communicates with and controls the operation of the base station wireless transceiver 935 by sending commands and data to the wireless interface and base station transceiver 935 over the system bus 930 and receiving status and data back in a similar manner.

The base station 7 communicates with other devices, for example, with the server 500, through a network interface 945. The network interface 945 communicates with the base station controller 900 through, for example, the system bus

930. The network interface communicates with, for example, the server 500 through a network 505 which is any combination of wired and/or wireless networks utilizing any combination of network protocols including, but not limited to, Ethernet, Wi-Fi, LTE, 4G, 5G, and CDMA.

For completeness, optional input and output devices 980/990 are shown such as a display 980 and a keyboard 990, though many different back end architectures are anticipated including one or more processors/computer systems, linked together for distribution and/or redundancy reasons along with a variety of input and output devices optionally including any or all of card readers, badge readers, indicator lights, lighting control systems, audible alarms, interfaces to cell locking systems, interfaces to door locking systems, camera systems, motion detection systems, door open/closed detection systems, etc.

In some embodiments, the base station 7 also includes base station tamper detection 985 similar or different from the tamper detection of the body-worn device 8. In such, intrusion into the base station 7 and/or relocation of the base station outside of a given allowed area is determined, recorded, and/or alerted. For example, in one embodiment, the base station tamper detection 985 includes a location detecting device (e.g., GPS) that constantly monitors the location of the base station 7. If the base station 7 is moved to a new location that is outside of a predetermined area, alerts are made such as transmitting an alert to a server 500, locking/encrypting data, etc. Other types of base station tamper detectors 985 are anticipated, including, but not limited to, motion sensors, accelerometers, etc. It is also anticipated that the base station 7 be physically affixed to furniture to reduce chances of removal.

In some embodiments, the base station 7 is/are mobile devices, allowing for the base station 7 to be portable and carried by the person on house arrest, for example, to a place of employment.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for detecting degradation of a fiber optic in a strap of a body-worn device, the system comprising:
    the body-worn device having a processor, a transceiver operatively coupled to the processor, a tamper detection circuit, and a source of power, the source of power providing operational power to the processor, to the transceiver, and to the tamper detection circuit;
    the tamper detection circuit emits light energy into a first end of a fiber optic and waits for reception of the light energy from a distal end of the fiber optic;
    when the light energy is received and detected by the tamper detection circuit at the distal end of the fiber optic, the tamper detection circuit declares that the strap of the body-worn device is intact;
    when the light energy is not received by the tamper detection circuit, the tamper detection circuit increases the light energy until either the light energy is at a maximum light energy or the light energy is received by the tamper detection circuit at the distal end of the fiber optic; and
    when the light energy is at the maximum light energy, the tamper detection circuit declares that the strap of the body-worn device is disconnected and when the light energy is received by the tamper detection circuit at the distal end of the fiber optic, if the light energy is greater than a pre-determined threshold, the tamper detection circuit declares that the body-worn device requires servicing.

2. The system of claim 1, wherein the tamper detection circuit increases the light energy by increasing a pulse width of the light energy.

3. The system of claim 1, wherein the tamper detection circuit increases the light energy by increasing a brightness of the light energy.

4. The system of claim 1, wherein the tamper detection circuit increases the light energy by increasing both a pulse width of the light energy and a brightness of the light energy.

5. The system of claim 1, wherein after the tamper detection circuit declares that the strap of the body-worn device is disconnected, the tamper detection circuit signals the processor to record an event indicating that the strap of the body-worn device is disconnected.

6. The system of claim 1, wherein after the tamper detection circuit declares that the strap of the body-worn device is disconnected, the tamper detection circuit signals the processor and the processor controls a wireless transceiver to send an indication to a remote server indicating that the strap of the body-worn device is disconnected.

7. The system of claim 1, wherein after, the tamper circuit declares that the body-worn device requires servicing, the tamper detection circuit signals the processor and the processor controls a wireless transceiver to send an indication to a remote server indicating that the strap of the body-worn device requires servicing.

8. A method of detecting degradation of a fiber optic in a strap of a body-worn device, the method comprising:
    (a) sending an amount of light energy into a first end of the fiber optic, the fiber optic passes through the strap of the body-worn device;
    (b) monitoring a second end of the fiber optic, looking for the light energy;
    (c) after receiving and detecting the light energy, declaring that the strap of the body-worn device is intact;
    (d) increasing the light energy;
    (e) if the light energy is greater than a maximum light energy, declaring that the strap of the body-worn device is not intact;
    (f) if the light energy is greater than a light energy threshold, declaring that the body-worn device requires servicing; and
    (g) repeating steps (a) through (f).

9. The method of claim 8 whereas after declaring that the strap of the body-worn device is not intact, sending a transaction to a server indicating that the strap of the body-worn device is not intact.

10. The method of claim 8 whereas after declaring that the body-worn device requires servicing, sending a transaction to a server indicating that the body-worn device requires servicing.

11. The method of claim 8, whereas the step of increasing the light energy includes increasing a pulse width of the light energy.

12. The method of claim 8, whereas the step of increasing the light energy includes both increasing a pulse width of the light energy and increasing an amplitude of the light energy.

13. The method of claim 8, whereas the step of increasing the light energy includes increasing an amplitude of the light energy.

14. A system for detecting degradation of a fiber optic in a strap of a body-worn device, the system comprising:
- a processor integrated into the body-worn device;
- computer instructions stored in a non-transitory storage medium that is interfaced to the processor;
- the computer instructions cause the processor to control a light emitter to emit a light at a light energy into a first end of a fiber optic, the fiber optic passes through the strap of the body-worn device;
- the computer instructions cause the processor to monitor a second end of the fiber optic, looking for reception and detection of the light energy;
- when the light energy is received, the computer instructions cause the processor to declare that the strap of the body-worn device is intact;
- when the light energy is not received and not detected, the computer instructions cause the processor to increase the light energy until either the light energy is received and detected at the second end of the fiber optic or until the light energy is greater than a maximum light energy;
- when the light energy is received, the computer instructions cause the processor to declare that the strap of the body-worn device is intact;
- when the light energy is greater than the maximum light energy, the computer instructions cause the processor to declare that the strap of the body-worn device is not intact; and
- when the light energy is greater than a light energy threshold, the computer instructions cause the processor to declare that the body-worn device requires service.

15. The system of claim 14, wherein the computer instructions cause the processor to increase the light energy by increasing a duration of the light energy.

16. The system of claim 14, wherein the computer instructions cause the processor to increase the light energy by increasing a brightness of the light energy.

17. The system of claim 14, wherein the computer instructions cause the processor to increase the light energy by both increasing a duration of the light energy and increasing a brightness of the light energy.

18. The system of claim 14, further comprising after the computer instructions cause the processor to declare that the strap of the body-worn device is not intact, computer instructions cause the processor to control a wireless transceiver to send a transaction to a server, the transaction indicating tampering has occurred.

19. The system of claim 14, further comprising after the computer instructions cause the processor to declare that the body-worn device requires service, computer instructions cause the processor to control a wireless transceiver to send a transaction to a server, the transaction indicating the body-worn device requires service.

* * * * *